UNITED STATES PATENT OFFICE.

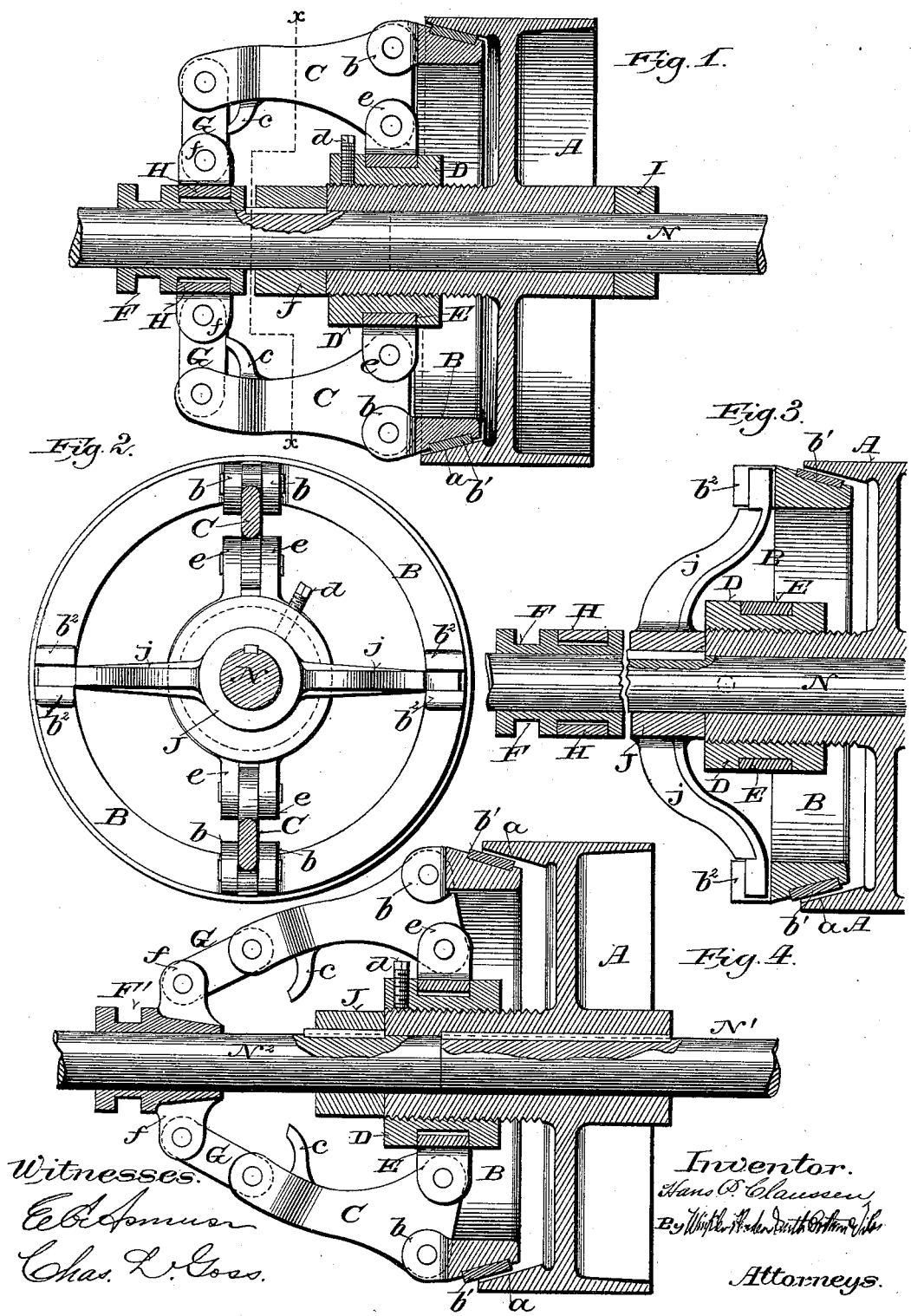

HANS P. CLAUSSEN, OF MILWAUKEE, WISCONSIN, ASSIGNOR TO THE BRUNO NORDBERG COMPANY, OF SAME PLACE.

FRICTION-CLUTCH.

SPECIFICATION forming part of Letters Patent No. 451,727, dated May 5, 1891.

Application filed March 31, 1890. Serial No. 345,998. (No model.)

*To all whom it may concern:*

Be it known that I, HANS P. CLAUSSEN, of Milwaukee, in the county of Milwaukee and State of Wisconsin, have invented certain new and useful Improvements in Friction-Clutches; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to transmit motion to or from the frictional contact parts independently of the mechanism by which those parts are moved into and out of engagement with each other, to maintain the proper adjustment of the frictional surfaces, and to produce perfect engagement thereof.

It consists, essentially, of certain peculiarities in the construction and arrangement of the parts composing the clutch, hereinafter particularly described, and pointed out in the claims.

In the accompanying drawings like letters designate the same or similar parts in the several figures.

Figure 1 is an axial section of a friction clutch-pulley embodying my improvements. Fig. 2 is a cross-section of the same on the line $x$ $x$, Fig. 1. Fig. 3 is an axial section taken at right angles to the section shown in Fig. 1, and Fig. 4 is an axial section of a modified form of the device designed for a coupling for connecting and disconnecting line-shafting.

A is a pulley loosely mounted upon the shaft N and held in place lengthwise upon said shaft by the collar I and hub J, keyed or otherwise suitably fixed upon said shaft. The pulley A is formed on one side with an interior coned friction-surface. B is a ring formed on its periphery with a corresponding coned surface, which is provided with a facing $b'$ of wood, paper, or other suitable material.

C C are bell-crank-levers fulcrumed to a collar E by means of the ears $e$ $e$ formed thereon and connected by their shorter arms with ears $b$ $b$, formed for the purpose on ring B. The longer arms of these levers are connected by links G G with a collar H, loosely mounted upon the sleeve F, which is movable lengthwise upon the shaft N. The collar E, to which said levers are fulcrumed, is loosely mounted upon a sleeve D, which is adjustable axially upon the hub of the pulley A and is capable of turning in said collar E. For this purpose the hub of said pulley may be screw-threaded externally and the sleeve D screw-threaded internally, so as to engage therewith and be moved axially with reference to the clutch-shaft by screwing it toward or from the pulley A. It is held in place when properly adjusted by a set-screw $d$.

The rotary movement of the ring B, when the same is engaged by the friction-surface $a$ of the pulley A, is communicated to the shaft N by arms $j$ $j$, formed upon the hub J, and projecting at their ends loosely between lugs $b^2$ $b^2$, formed on the outer surface of ring B, as shown in Figs. 2 and 3. By this arrangement the levers C C, serving to move the ring B into and out of engagement with the friction-surface of pulley A, are relieved of torsional strain and at the same time the necessary lateral movement of said ring is permitted.

When the friction-surfaces are out of engagement and the ring B, levers C, and shaft N are at rest, the sleeve D turns freely in the collar E, to which said levers are fulcrumed. The collar H, with which the levers C are connected at their outer ends by links G, is allowed a limited amount of play or movement upon the sleeve F transversely to its axis, so as to permit said levers to adjust themselves to any irregularities or inequalities in the contact-surfaces of the ring B and pulley A, and thereby produce and maintain uniform and perfect engagement of said surfaces when they are brought together.

To arrest the movement of the sleeve F toward the pulley A at the proper point, lugs $c$ $c$ are formed on the inner sides of the levers C C to engage the links G G when they are moved toward the pulley A a little past a perpendicular to the clutch-shaft.

The levers C are adjusted to take up wear on the friction-surfaces and to produce proper engagement thereof by moving the sleeve D, carrying their fulcrums toward or from the pulley A, as required. By this means the foregoing adjustment is effected in a single operation.

Referring to Fig. 4, illustrating a modification of the clutch designed for a coupling for connecting two shafts N' N², which are in line with each other and terminate at their adjacent ends within the hub of the pulley A so as to maintain their alignment, the pulley A is keyed or otherwise fixed upon the shaft N', and the hub J of the power-transmitting arms *j j* is keyed or otherwise fixed upon the shaft N². With this arrangement the pulley A preferably serves as the driver, but it may be reversed so that the ring B becomes the driving and the pulley A (or a friction-ring substituted in its place) the driven part of the clutch. The collar E is shown as capable of movement upon the sleeve D transversely to its axis for the same purpose that the collar H (shown in Fig. 1) is made capable of a similar movement upon the sleeve F. With this arrangement for the automatic adjustment of the frictional parts and the levers, by which one is moved into and out of engagement with the other, the links G G are pivoted directly to the sleeve F' by means of ears *f f* formed thereon.

The construction shown in Figs. 1 to 3, inclusive, may be employed as a coupling for connecting two shafts in line by terminating said shafts at a point within the hub of the pulley A, (indicated by a dotted line,) and by keying or otherwise fixing the pulley A to the shaft on which it is mounted. The result in the self adjustment of the friction-ring B and its operating-levers C with reference to the frictional surface of the pulley A, whereby uniform and perfect engagement of the frictional surfaces is produced, is the same, whether movement transverse to the clutch-shaft is permitted the fulcrums of the levers or the connections at their outer ends with the clutch-shaft.

Various modifications in the details of the device may be made without affecting its mode of operation or departing from the spirit of my invention.

I claim—

1. In a friction-clutch, the combination of friction-jaws, one movable lengthwise of the clutch-shaft toward and from the other, angular levers pivoted to the movable jaw and fulcrumed to the fixed jaw, and power-transmitting arms fixed to the shaft upon which they are mounted and loosely engaging with said movable jaw, so as to permit of its lateral movement, substantially as and for the purposes set forth.

2. In a friction-clutch, the combination of friction-jaws, one movable lengthwise of the clutch-shaft toward and from the other, a collar adjustable axially with reference to the clutch-shaft, angular levers fulcrumed to said collar and connected with the movable jaw, and power-transmitting arms fixed upon the clutch-shaft and loosely connected with the movable jaw, so as to turn therewith, but permit of its lateral movement, substantially as and for the purposes set forth.

3. In a friction-clutch, the combination of friction-jaws, one movable lengthwise of the clutch-shaft toward and from the other, a collar adjustable axially with reference to the clutch-shaft, angular levers fulcrumed to said collar and pivoted to said movable jaw, a collar linked to said angular levers and capable both of longitudinal and transverse movement with reference to the clutch-shaft, and power-transmitting arms fixed upon the clutch-shaft and loosely connected with the movable jaw, so as to turn therewith, but to permit of the lateral movement of said jaw, substantially as and for the purposes set forth.

4. In a friction-clutch, the combination of friction-jaws, one movable toward and from the other, which is provided with a sleeve adjustable axially upon its hub, a collar loosely mounted upon said sleeve, which is capable of turning therein, angular levers fulcrumed to said collar and connected with one of said jaws, and power-transmitting arms fixed upon the shaft upon which they are mounted and loosely connected with the movable jaw, substantially as and for the purposes set forth.

5. The combination, in a friction-clutch, of a laterally-fixed friction-jaw provided with a hub, a sleeve adjustable axially upon said hub, a collar mounted upon said sleeve, which is capable of turning therein, a friction-jaw movable laterally into and out of engagement with the fixed jaw, angular levers fulcrumed to the collar upon said sleeve and connected by their shorter arms with the movable jaw and by their longer arms with a sleeve movable axially on the clutch-shaft, and power-transmitting arms fixed to the clutch-shaft and loosely engaging said movable jaw, so as to turn therewith and at the same time permit of the lateral movement thereof, substantially as and for the purposes set forth.

6. In a friction-clutch, the combination of friction-jaws, one movable into and out of engagement with the other, angular levers connected by their shorter arms with said movable jaw and fulcrumed to an adjunctive part of the other, and a collar with which said levers are connected movably transversely to the axis of the clutch, substantially as and for the purposes set forth.

In testimony that I claim the foregoing as my own I affix my signature in presence of two witnesses.

HANS P. CLAUSSEN.

Witnesses:
CHAS. L. GOSS,
E. G. ASMUS.